Feb. 25, 1930.  G. R. HOOKER ET AL  1,748,930
VEHICLE SIGNAL
Filed May 3, 1929
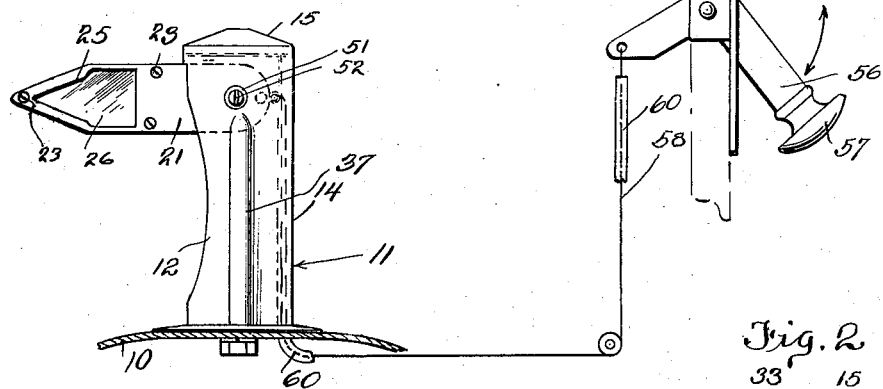
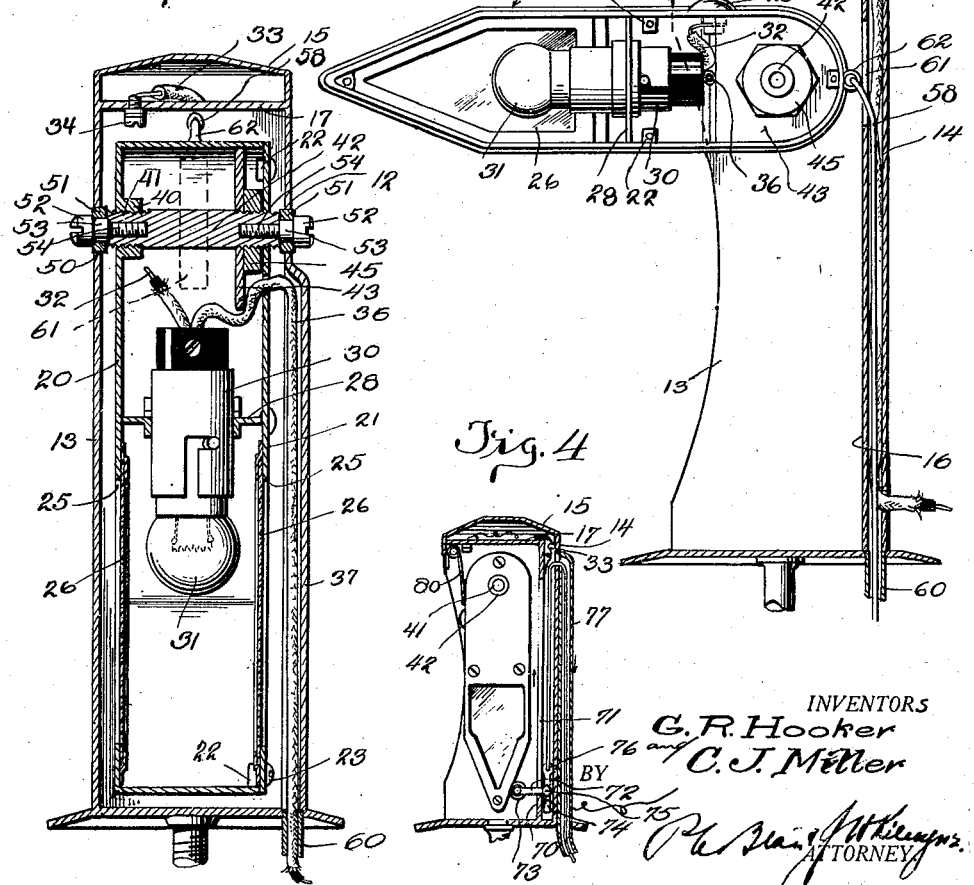
INVENTORS
G. R. Hooker
C. J. Miller
BY
ATTORNEY Patented Feb. 25, 1930

1,748,930

UNITED STATES PATENT OFFICE

GEORGE R. HOOKER AND CHARLES J. MILLER, OF BUFFALO, NEW YORK

VEHICLE SIGNAL

Application filed May 3, 1929. Serial No. 360,264.

This invention relates to improvements in direction indicators for vehicles.

A main object of the invention is to provide an improved indicator by which the driver of a vehicle is enabled to warn front and rear traffic of an intended turn. A further object is to provide a vehicle signal which is automatically illuminated on actuation of an indicator and thereby advantageous for both day and night driving. A further object is to provide a vehicle direction indicator in the nature of a pivoted arm which is manually operable by the driver. A further object is to provide an improved mounting for the pivoted arm which is manually operable by the driver. A further object is to provide an improved mounting for the pivoted arm of the above described character. A further object is to provide an improved means of actuating the direction indicator. A further object is to provide a simple, durable and rugged direction indicator, which is inexpensive in manufacture and assembly, and which efficiently meets all conditions of use and service.

Other objects will be in part obvious from the annexed drawing and in part indicated from the following analysis of the invention, in which reference is made to the accompanying drawing illustrating an embodiment of our idea.

In this drawing—

Fig. 1 is a side elevation of the indicator casing mounted on the left side fender of a vehicle, and with the indicator arm in raised position, the actuating means being diagrammatically illustrated;

Fig. 2 is an enlarged elevation of the indicator shown in Fig. 1 with certain parts broken away;

Fig. 3 is a longitudinal vertical section of the indicator with the indicator arm shown in retracted or down position;

Fig. 4 is an elevation, with certain parts broken away, of a modified form of indicator arm actuating means.

Referring to the drawings, the indicator is illustrated, for convenience in description, as mounted on either the front or rear fender 10 of the left side of the vehicle, it being understood, however, that the indicator may be arranged on the side of the vehicle body or on the top frame. The numeral 11 designates a substantially rectangular casing comprising side walls 12, 13, respectively, end wall 14, and top 15, suitably mounted upon a base. One side of the casing is left open to permit movement therethru of an indicator arm, to be hereinafter described. The casing 11 is preferably cast from aluminum and its outer surface polished or nickel-plated to provide an attractive appearance.

Referring to Fig. 2, we provide within the casing 11 a false wall 16 extending between the walls 12, 13, and spaced from the side wall 14, to form therewith a compartment. Similarly, there is spaced from the top 15 of the casing a false wall or partition 17 providing an open space communicating with the vertical compartment formed by the false wall 16.

Within the casing, we mount for swinging movement an indicating arm, generally in the form of an arrow, and preferably made of a cast three-sided body portion 20 and a cover plate 21, the said body portion being cast hollow. The body portion is provided with suitable lips 22, into which fastening screws 23 passing thru the cover plate 21 are threaded. Upon removal of the cover plate 21, access to the indicator arm is permitted. The back wall of the body portion 20, and the plate 21 are provided with cut-out portions 25 which are closed by glass panels 26 suitably colored, and, if desired, bearing suitable legends such as "Left", "Right", or "Stop". The said panels 26 may be contrastingly colored to conform to local traffic regulations.

Interior of the indicator arm, a transverse partition wall 28 is arranged to carry a socket 30 in which a light bulb 31 may be inserted as by means of the usual bayonet connection. A wire 32 is permanently connected to the plug 30 and to a contact 29 disposed on the exterior surface of the indicator arm. A lead wire 33 from the battery is run thru the spaces formed between the end walls 14, 16, and top walls 15, 17, and is electrically connected to a resilient terminal 34 disposed on the false wall 17.

It will be understood that the lamp circuit is automatically closed to illuminate the lamp 31 as the indicator arm is actuated to its raised position shown in Fig. 2, as in such position the contact 29 engages the terminal 34. Conversely, the lamp circuit is automatically broken as the indicator arm returns to its initial position. The lamp circuit is grounded to the vehicle body in any suitable manner, thru a return wire 36 passing thru an aperture in the cover plate 21, and thereafter extending downwardly thru an upset channel 37 formed in the side 13 of the casing.

In order to provide a frictionless and free swinging movement for the indicator arm, we provide a special mounting as more clearly shown in Fig. 3. The end wall of the body portion 20 is provided with a cast hub 40, which is apertured and threaded to receive a threaded portion 41 of an axle or bearing shaft 42. A fixed partition wall 43 extends in spaced relation to the cover plate 21, the partition wall and the cover plate being each provided with a suitable aperture thru which the other end of axle 42 projects. A holding nut 45 is threaded on to the other end of the axle 42 and bears against the partition wall 43, thereby securing the axle to the indicator arm in fixed relation. It will be understood that the axle 42 is of a length to be received between the parallel side walls 12, 13 of the casing 11, the space between such parallel walls being hereinafter termed the width of the casing and upon assembly of the cover plate 21 on the body portion of the arm, there is provided an arm unit including the axle 42, which unit may be bodily positioned within the casing 11 thru the open side thereof.

Each of the side walls 12, 13 of the casing 11 is provided with an axially aligned journal opening 50, and when the axle 42 is positioned in registry therewith, bearing bushings 51 are inserted into said journal openings. End screws 52 provided with machined shoulders 53 and constituting bearing studs pass thru bushings 51 and terminate in threaded portions 54 which are threaded into the ends of the axle 42. The said bushings 51 thus forming bearings on which the shoulders 53 of the end screws 52, and consequently the axle, are freely rotatable.

The indicator arm is manually operable by an actuator, preferably positioned on the dash board of the vehicle, the said actuator comprising a plate 55 thru which extends a pivoted blade 56 in the form of a bell crank lever. One arm of the lever is provided with an operating knob 57, and the other end thereof is secured to a cable 58 extending thru suitable projecting tubes 60 and passing into the space formed between false wall 16 and side wall 14 of casing 11. Adjacent the top portion thereof, the false wall 16 is provided with a slot 61 thru which the cable passes and is thereafter suitably secured to the indicator arm, as by an eye 62 thereof. It will be understood that a down actuation of the knob 57 exerts a tension on the cable 58 to actuate the indicator arm about its pivotal mounting. Two such knobs 57 are provided on the panel 55, one to control an indicator positioned on either the front or rear fender of a vehicle at one side thereof, and the other to control a like indicator mounted at the other side of the vehicle. It will be understood that front and rear indicators positioned in pairs upon both sides of the car may be simultaneously actuated by a single knob 57 without material modification, and such arrangement is within the scope of the present invention.

As previously noted, the bulb 31 is illuminated as the indicator arm is raised to its position shown in Fig. 2. Such illumination may be effected during day and night time, or may be limited only to night driving, the lamp circuit to be controlled by a switch positioned on the vehicle dash (not shown).

The above described construction of casing with false side and top walls houses and substantially conceals the actuating cable 58 and lead wire 33 to aid in the appearance of the device. The said cable and wire being substantially enclosed are also protected and remain water-proof, and this arrangement further effectively eliminates any possibility of the wire or cable becoming twisted about the indicator arm during its actuation.

In Fig. 4 there is illustrated a modified form of indicator arm actuation, in which the arm is mounted in the casing for swinging movement generally in the manner above described. A false wall 70 is provided with an elongated slot 71, thru which extends an arm 72 carrying at its free end a roller 73 which engages the under surface of the indicator arm. The arm extends from a vertically arranged block 74 confined within the space formed between the walls 14, 70, and is restrained against pulling therefrom by any suitable means such as lugs 75 engaging the inner face of the wall 70. The operating cable operates in a tube or channel 77 opening into the compartment and is secured to an eye 76 formed at the top of the block 74. As the cable is tensioned upon pushing down the operating knob 57, the block 74 and arm 72 are raised, causing the roller 73 to cam against the indicator arm, thereby to force the same outwardly and about its pivotal mounting. Any approved spring means 80 to bring the indicator arm back to its initial position may be provided, the weight of the arm aiding said spring in causing the arm to assume and thereafter maintain its retracted position.

It will be seen that the several objects of the invention are achieved and other advantageous results attained. As many changes could be made in carrying out the above invention, without departing from the scope thereof, it is intended that all matter contained in the above description or shown in the accompanying drawing shall be interpreted as illustrative and not in a limiting sense.

We claim:

1. A vehicle signal comprising a casing having side walls with bearing apertures and an open side, a hollow indicator arm in said casing having an opening opposite a side wall of said casing, a bearing shaft, means for rigidly securing said shaft in the arm with one end extending thru said opening, including a threaded aperture thru the side of the arm opposite the opening, a removable cover for said opening having an aperture permitting passage of said shaft, and screw-threaded bearing studs passing thru said bearing apertures into screw-threaded openings in the ends of the bearing shaft.

2. A vehicle signal comprising a casing having side walls with bearing apertures and an open side, a hollow indicator arm in said casing having an opening opposite a side wall of said casing, a bearing shaft of a length to be received between the side walls of the casing, means for rigidly securing said shaft in the arm with one end extending thru said opening, including a threaded aperture thru the side of the arm opposite the opening, a removable cover for said opening having an aperture permitting passage of said shaft, the indicator arm, the shaft and the cover, upon assembly, being insertable and removable as a unit thru the open side of the casing, and screw-threaded bearing studs passing thru said bearing apertures into screw-threaded openings in the ends of the bearing shaft.

3. A vehicle signal comprising a casing having side walls, an end wall and a top, the casing being open at one side, an indicator arm mounted in the casing for swinging movement thru the open side, a false wall having an aperture therein and disposed adjacent said end wall and spaced therefrom to provide a compartment, a false wall adjacent the top and spaced therefrom to provide a compartment opening into the first named compartment, a terminal disposed on the last named false wall, a lead wire extending thru said compartments and electrically connected to said terminal, and a contact carried by said arm and engaging said terminal upon actuation of the arm, and a means extending into said first compartment and thru the aperture of said first named false wall and secured to the indicating arm to actuate the same.

Signed at Buffalo, New York, this 19th day of April, 1929.

GEORGE R. HOOKER.
CHARLES J. MILLER.